United States Patent
Tetsuno

(10) Patent No.: US 7,706,961 B2
(45) Date of Patent: Apr. 27, 2010

(54) DIESEL ENGINE SYSTEM AND METHOD OF CONTROLLING DIESEL ENGINE

(75) Inventor: Masayuki Tetsuno, Hiroshima (JP)

(73) Assignee: Mazda Motor Corporation (JP)

( * ) Notice: Subject to any disclaimer, the term of this patent is extended or adjusted under 35 U.S.C. 154(b) by 70 days.

(21) Appl. No.: 12/204,997

(22) Filed: Sep. 5, 2008

(65) Prior Publication Data

US 2009/0070020 A1    Mar. 12, 2009

(30) Foreign Application Priority Data

Sep. 10, 2007    (JP) ............................. 2007-233842

(51) Int. Cl.
*F02D 41/06* (2006.01)

(52) U.S. Cl. .................... 701/113; 123/491; 123/179.4; 123/179.16

(58) Field of Classification Search .............. 123/179.4, 123/179.16, 179.17, 179.21, 491; 701/113
See application file for complete search history.

(56) References Cited

U.S. PATENT DOCUMENTS

| | | | | |
|---|---|---|---|---|
| 5,251,590 A | * | 10/1993 | Faletti et al. ........... | 123/179.21 |
| 6,062,186 A | * | 5/2000 | Barnes et al. ............ | 123/179.3 |
| 6,935,294 B1 | * | 8/2005 | Kalkstein ................ | 123/179.31 |
| 7,234,442 B2 | * | 6/2007 | Hanson et al. ............... | 123/332 |
| 2005/0279323 A1 | * | 12/2005 | Lewis et al. ................. | 123/321 |
| 2007/0039582 A1 | * | 2/2007 | Laubender ............. | 123/179.15 |
| 2007/0119403 A1 | * | 5/2007 | Laubender ............... | 123/179.3 |
| 2008/0257311 A1 | * | 10/2008 | Spicer et al. ................. | 123/481 |
| 2009/0120396 A1 | * | 5/2009 | Krenus et al. .......... | 123/179.16 |

FOREIGN PATENT DOCUMENTS

JP    2006046251    2/2006

* cited by examiner

*Primary Examiner*—Erick Solis
(74) *Attorney, Agent, or Firm*—Studebaker & Brackett PC; Donald R. Studebaker

(57) ABSTRACT

In a process of automatically stopping a diesel engine upon fulfillment of automatic engine stop conditions, an ECU cuts off fuel injection when the engine speed equals a preset first engine speed N1. The ECU limits the amount of intake air at the first engine speed N1 and, then, increases the amount of intake air at a point in time when the engine speed equals a second engine speed N2, at which point a piston in a cylinder which will be on a compression stroke at engine stop is expected to transfer to a last intake stroke, so that the piston in the compression stroke cylinder at engine stop stops at a point within a specified range closer to the bottom dead center than a piston in a cylinder which will be on an expansion stroke at engine stop.

20 Claims, 4 Drawing Sheets

DIESEL ENGINE SYSTEM AND METHOD OF CONTROLLING DIESEL ENGINE

BACKGROUND OF THE INVENTION

1. Field of the Invention

The present invention relates to a diesel engine system and a method of controlling a diesel engine.

2. Description of the Related Art

There is a general tendency today to employ an automatic stop/restart control system in a diesel engine. As described in Japanese Unexamined Patent Publication No. 2006-46251, for example, an automatic stop/restart control system of a diesel engine stops the engine when prescribed automatic engine stop conditions are satisfied and restarts the automatically stopped engine when prescribed engine restart conditions are satisfied.

For restarting the automatically stopped diesel engine, it is necessary to inject fuel into a cylinder which was in a compression stroke at automatic engine stop to induce self-ignition in the cylinder. A problem often encountered with a diesel engine having an automatic stop/restart feature is deterioration of starting performance which is caused by a reduction in engine temperature occurring after the automatic engine stop. The aforementioned Publication describes a conventional arrangement for supplying a large electric current to glow plugs of the diesel engine at the beginning of cranking as well as an approach to solving the problem by increasing the amount of electric current supplied to the glow plug of a cylinder which was in the compression stroke at engine stop compared to the amount of electric current supplied to the other glow plugs.

Although intended to improve ignitability (restartability) of the diesel engine, the aforementioned approach of the Publication will cause deterioration of fuel economy and more frequent replacement of the glow plugs. This is because the approach of the Publication aims at improving the ignitability by just increasing the amount of electric current supplied to the glow plug at engine restart, which necessitates an undue increase in the amount of electricity and energizing period of the glow plugs.

SUMMARY OF THE INVENTION

The present invention is intended to overcome the aforementioned problem of the prior art. Accordingly, it is an object of the invention to provide a diesel engine system and a method of controlling a diesel engine capable of achieving enhanced restartability of the diesel engine after an automatic engine stop while providing as high fuel economy as possible.

According to a first aspect of the present invention, a method of controlling a diesel engine comprises the steps of: (a) stopping fueling the engine upon fulfillment of an engine stop condition while the engine is running; (b) positioning a piston of a first cylinder, which is in a compression stroke of a cylinder cycle when the engine completely stops, at a first stop position that is closer to the bottom dead center than to the top dead center; and (c) cranking the engine and starting fueling the engine by first injecting fuel into the first cylinder upon fulfillment of an engine restart condition while the engine is at rest.

This method of controlling a diesel engine causes the piston of a particular cylinder to stop at a position appropriate for subsequent engine restart upon fulfillment of the engine stop condition, making it possible to provide enhanced engine restartability. Generally, it is necessary in the diesel engine to inject the fuel into a compression stroke cylinder at engine stop and induce self-ignition of an air-fuel mixture formed in that cylinder. It is therefore preferable that the piston in the compression stroke cylinder at engine stop would stop at a point as close as possible to the bottom dead center because it increases the temperature in the cylinder when it reaches at the top dead center at an engine restart.

The method of the first aspect, by positioning the piston of the compression stroke cylinder at a first stop position that is closer to the bottom dead center than to the top dead center, may increase the effective compression ratio of and the temperature in the compression stroke cylinder at an engine restart. As a result, it may improve the engine restartability.

According to a second aspect of the present invention, a method of controlling a diesel engine comprises the steps of: (a) stopping fueling the engine upon fulfillment of an engine stop condition while the engine is running; (b) cranking the engine and starting fueling the engine by first injecting fuel into a first cylinder which is in a compression stroke of a cylinder cycle when the engine completely stops if a piston of the first cylinder is positioned at a first position closer to the bottom dead center than to the top dead center; and (c) cranking the engine and starting fueling the engine by first injecting the fuel into a second cylinder which is in an intake stroke of a cylinder cycle when the engine completely stops if the piston of the first cylinder is positioned between the top dead center and the first stop position.

In this method of controlling a diesel engine, if the piston in the compression stroke cylinder at engine stop is located generally at an appropriate stop position, the fuel is injected into the compression stroke cylinder at engine stop and a starter motor is run to compress an air-fuel mixture formed in the compression stroke cylinder, thereby inducing self-ignition therein and restarting the diesel engine. If the piston in the compression stroke cylinder at engine stop is displaced from the appropriate stop position toward the top dead center, the fuel is injected into the intake stroke cylinder, and not the compression stroke cylinder at engine stop. Although operating time of the starter motor slightly increases in this case, it is possible to securely induce self-ignition of an air-fuel mixture at a sufficiently high effective compression ratio, thereby providing enhanced engine restartability.

According to a third aspect of the invention, a diesel engine system comprises: (a) a diesel engine having cylinders including a first cylinder, pistons, a crankshaft linked to the pistons for reciprocally moving the pistons in the cylinders, and fuel injectors capable of directly injecting fuel into the respective cylinders; (b) a throttle valve arranged in an intake air passage of the diesel engine for throttling intake air into the cylinders; (c) a starter motor capable of rotating the crankshaft; and (d) a controller which controls; (i) the fuel injectors to stop fueling the cylinders upon fulfillment of an engine stop condition; (ii) the throttle valve to close upon fulfillment of the engine stop condition and open when the engine speed reaches a predetermined speed so that the piston of the first cylinder, which is in a compression stroke of a cylinder cycle when the engine completely stops, stops at a first stop position that is closer to the bottom dead center than to the top dead center; and (iii) the starter motor to crank the engine and the fuel injectors to start fueling the engine by first injecting the fuel into the first cylinder upon fulfillment of an engine restart condition.

This diesel engine system is configured such that the pistons are stopped at positions appropriate for subsequent engine restart upon fulfillment of the engine stop condition, thereby providing enhanced engine restartability as described above with respect to the first aspect of the invention.

These and other objects, features and advantages of the present invention will become more apparent upon a reading of the following detailed description along with the accompanying drawings.

DETAILED DESCRIPTION OF THE PREFERRED EMBODIMENT OF THE INVENTION

Figure 1:
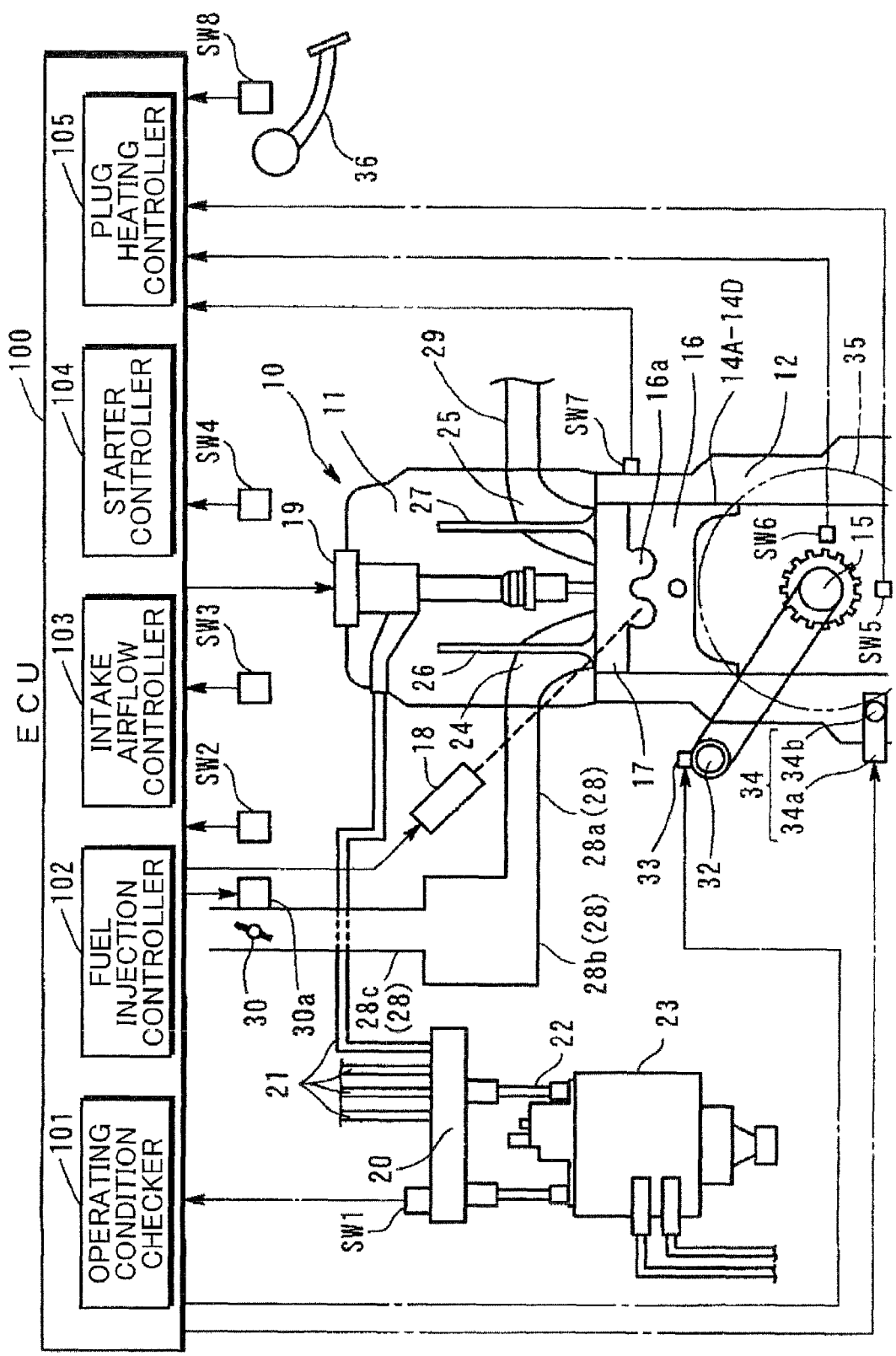
FIG. 1 is a schematic diagram of a four-stroke diesel engine provided with an automatic stop/restart control system according to a preferred embodiment of the invention.

A preferred embodiment of the present invention is now described in detail with reference to the accompanying drawings. FIG. 1 is a schematic diagram of a four-stroke diesel engine 10 according to the embodiment of the invention.

As shown in FIG. 1, the engine 10 comprises a cylinder head 11 and a cylinder block 12, in which four cylinders 14A-14D (which may collectively be referred to as the cylinders 14 hereinbelow) are formed. Fitted in the four cylinders 14A-14D are pistons 16 which are joined to a crankshaft 15 by respective connecting rods (not shown). Each of the pistons 16 has a cavity 16a formed in a top surface thereof. There is formed a combustion chamber 17 in each of the cylinders 14A-14D, the combustion chamber 17 being bounded by an inside surface (bottom) of the cylinder head 11 and the cavity 16a formed in the piston 16. The pistons 16 fitted in the individual cylinders 14A-14D move up and down with specific phase differences as the crankshaft 15 rotates. In the engine 10 of this embodiment which is a four-cylinder, four-stroke engine, the four cylinders 14A-14D go through repetitive cycles of intake, compression, expansion and exhaust strokes with the specific phase differences. Particularly, the engine 10 is constructed such that a first cylinder (cylinder 14A as illustrated), a third cylinder (cylinder 14C as illustrated), a fourth cylinder (cylinder 14D as illustrated) and a second cylinder (cylinder 14B as illustrated) go through a sequence of these four stroke cycles in this order with a phase difference of 180° in terms of crank angle (CA).

The four cylinders 14A-14D are individually provided with glow plugs 18 which are fitted in the cylinder head 11 with extreme ends of the glow plugs 18 protruding into the combustion chambers 17 so that the glow plugs 18 serve as in-cylinder heating elements. The individual cylinders 14A-14D are also provided with fuel injectors 19 fitted in the cylinder head 11. The fuel injectors 19 are connected to a common rail 20 via branch pipes 21 which are provided for the individual cylinders 14a-14d for fuel delivery. The common rail 20 holds high-pressure fuel at or above an opening pressure (injection pressure) of the fuel injectors 19 and distributes the fuel to the individual cylinders 14a-14d. When electrically activated, each of the fuel injectors 19 electromagnetically opens an internal fuel passage, whereby the fuel pressure acts on a built-in pressure-sensitive valve of the fuel injector 19, thus causing the fuel injector 19 to inject the fuel through a plurality of spray orifices formed in a nozzle end directly into one of the cylinders 14A-14D toward the cavity 16a in the combustion chamber 17 thereof. In this embodiment, the common rail 20 is provided with a fuel pressure sensor SW1 for detecting the fuel pressure. The amount of fuel injected by each fuel injector 19 is controlled by an energizing period thereof. The common rail 20 for distributing the fuel to the individual cylinders 14a-14d is connected to a fuel pump 23 through a high-pressure fuel pipe 22.

In an upper portion of each of the cylinders 14A-14D, there are provided an intake port 24 and an exhaust port 25 opening into the combustion chamber 17. An intake valve 26 and an exhaust valve 27 are fitted in the intake port 24 and the exhaust port 25 for opening and closing the respective ports 24, 25 to thereby control the passage of an air-fuel mixture into and exhaust gases from the combustion chamber 17. The engine 10 has an intake passage 28 and an exhaust passage 29 connected to the intake port 24 and the exhaust port 25, respectively. The intake passage 28 branches off at a downstream portion thereof into branch intake lines 28a which are connected to the individual cylinders 14A-14D. Upstream ends of the branch intake lines 28a are connected to a surge tank 28b and to a common intake passage portion 28c which is provided further upstream of the surge tank 28b. While FIG. 1 schematically shows the construction of the engine 10, the common intake passage portion 28c is provided with an intake air shutter valve (throttle valve) 30 for regulating the amount of air introduced into the four cylinders 14A-14D, an airflow sensor SW2 for detecting the amount of intake air, an intake air pressure sensor SW3 for detecting intake air pressure and an intake air temperature sensor SW4 for detecting intake air temperature. The intake air shutter valve 30 is driven by an actuator 30a to move between open and closed positions. In the engine 10 of the embodiment illustrated in FIG. 1, the intake air shutter valve 30 is configured to permit a certain amount of air to pass through without completely closing off the common intake passage portion 28c even at a "fully closed" position.

The engine 10 is further provided with an alternator 32 which is connected to the crankshaft 15 by a timing belt, for example. The alternator 32 has a built-in regulator circuit 33 which controls a current flowing through a field coil (not shown) for adjusting an output voltage of the alternator 32 to thereby regulate the amount of electric power generated by the alternator 32. The regulator circuit 33 controls the amount of electric power generated by the alternator 32 in accordance with an electric load of a vehicle and a voltage of an onboard battery, for example, based on a control signal fed from an engine control unit (ECU) 100.

The engine 10 is provided also with a starter motor 34 including a motor body 34a and a pinion gear 34b. The pinion gear 34b is mounted on an output shaft of the motor body 34a in such a way that the pinion gear 34b can move back and forth relatively rotatably about the output shaft. The crankshaft 15 is associated with a ring gear 35 fixed to a flywheel (not shown), the ring gear 35 being held concentrically with an axis of rotation of the crankshaft 15. When the starter motor 34 is activated to restart the engine 10 thus structured, the pinion gear 34b moves to a specific engagement position where the pinion gear 34b meshes with the ring gear 35 fixed to the flywheel, thereby causing the crankshaft 15 to start rotating.

The engine 10 is provided also with a pair of first and second crank angle sensors SW5, SW6. The ECU 100 determines engine speed Ne based on a sensing signal (pulse signal) fed from the first crank angle sensor SW5. The ECU 100 also determines the angle of rotation of the crankshaft 15 based on a pair of mutually phase-offset sensing signals output from the two crank angle sensors SW5, SW6. The engine 10 is further provided with a water temperature sensor SW7 for detecting the temperature of engine cooling water and an accelerator stroke sensor SW8 for detecting throttle opening which corresponds to the amount of depression of an accelerator pedal 36 of the vehicle.

The ECU 100 for performing overall control operation of the engine 10 is essentially a microprocessor including a central processing unit (CPU), a group of counter timers, an interface, a memory and a bus for interconnecting these internal elements. The ECU 100 carries out various mathematical operations based on sensing signals fed from various sensing devices including the aforementioned sensors SW1-SW8 and outputs control signals to various actuator devices, such as the fuel injectors 19, the starter motor 34 and the glow plugs 18. For example, the ECU 100 calculates the amount of fuel to be injected, fuel injection timing and ignition timing appropriate for engine operating conditions and outputs pertinent control signals to the fuel injectors 19. Also, the ECU 100 calculates a target opening of the intake air shutter valve 30 suited to the engine operating conditions and outputs a control signal to the actuator 30a of the intake air shutter valve 30 so that the opening thereof matches the target opening.

The ECU 100 includes such logic blocks as an operating condition checking block 101 for checking out the engine operating conditions, a fuel injection control block 102 for controlling fuel injection into the individual cylinders 14A-14D of the engine 10 based on check results of the operating condition checking block 101, an intake airflow control block 103 for controlling the amount of intake air introduced into the individual cylinders 14A-14D based on the check results of the operating condition checking block 101, a starter control block 104 for controllably running the starter motor 34 of the engine 10 when specific engine restart conditions are satisfied based on the check results of the operating condition checking block 101, and a plug heating control block 105 for controlling the glow plugs 18.

The operating condition checking block 101 is a module for checking out various engine operating conditions based on sensing signals fed from such sensing devices as the fuel pressure sensor SW1, the airflow sensor SW2, the intake air pressure sensor SW3, the intake air temperature sensor SW4, the first and second crank angle sensors SW5, SW6, the water temperature sensor SW7 and accelerator stroke sensor SW8. The engine operating conditions examined by the operating condition checking block 101 include the fuel pressure, stop positions of the pistons 16, in-cylinder temperature, as well as whether the engine 10 is operating in a forward running condition or not. In particular, the operating condition checking block 101 examines the stop position of the piston 16 of a particular one of the cylinders 14A-14D at automatic engine stop and sets an appropriate stop position A at which the piston 16 of that particular cylinder 14 should preferably stop. In this embodiment, the appropriate stop position A of the piston 16 in the cylinder 14 which is on the compression stroke at automatic engine stop is set within a range of a crank angle of 120° to a crank angle of 100° (hereinafter referred to as 120° CA to 100° CA) before a top dead center (TDC) on the compression stroke by default.

As will be later described in detail, it is necessary in the diesel engine 10 to inject fuel into the cylinder 14 which is on the compression stroke at automatic engine stop and then induce self-ignition of an air-fuel mixture formed in that cylinder 14 (hereinafter referred to as the compression stroke cylinder 14) by moving the piston 16 in the cylinder 14 by activating the starter motor 34. It is therefore preferable that the piston 16 in the compression stroke cylinder 14 at automatic engine stop would stop at a point closer to a bottom dead center (BDC). On the other hand, however, the starter motor 34 needs to be run for a prolonged period of time if the piston 16 in the compression stroke cylinder 14 is located in the proximity of the BDC. Under such circumstances, the appropriate stop position A of the piston 16 in the compression stroke cylinder 14 is set within the range of 120° CA to 100° CA before the TDC to achieve secure self-ignition of the mixture in the compression stroke cylinder 14 and a reduction in operating time of the starter motor 34 by default.

When the in-cylinder temperature is higher, however, it is possible to reduce the effective compression ratio of the compression stroke cylinder 14 at engine stop so that a correction is made to shift the aforementioned appropriate stop position A of the piston 16 to a point closer to the TDC according to the in-cylinder temperature. The operating condition checking block 101 is configured to estimate the in-cylinder temperature based on data stored in the memory of the ECU 100. In this embodiment, the operating condition checking block 101 has the ability to check out a braking condition and vehicle speed based on sensing signals fed from unillustrated sensors.

The fuel injection control block 102 is a module for setting an amount of fuel to be injected corresponding to an appropriate air-fuel ratio and fuel injection timing of the engine 10 based on the check results of the operating condition checking block 101 and controllably activating the fuel injectors 19 according to the air-fuel ratio and the fuel injection timing thus set.

The intake airflow control block 103 is a module for setting an appropriate amount of intake air introduced into the engine 10 based on the check results of the operating condition checking block 101 and controllably driving the intake air shutter valve 30 according to the amount of intake air thus set.

The starter control block 104 is a module for outputting a control signal to the starter motor 34 for operating the same when starting up the engine 10.

The plug heating control block 105 is a module for controllably energizing the glow plugs 18 (referred to also as "heaters") during engine warm-up, for example. In this embodiment, the plug heating control block 105 differently controls the glow plugs 18 depending on the aforementioned appropriate stop position A which is determined according to the in-cylinder temperature and the fuel pressure.

Figure 2:
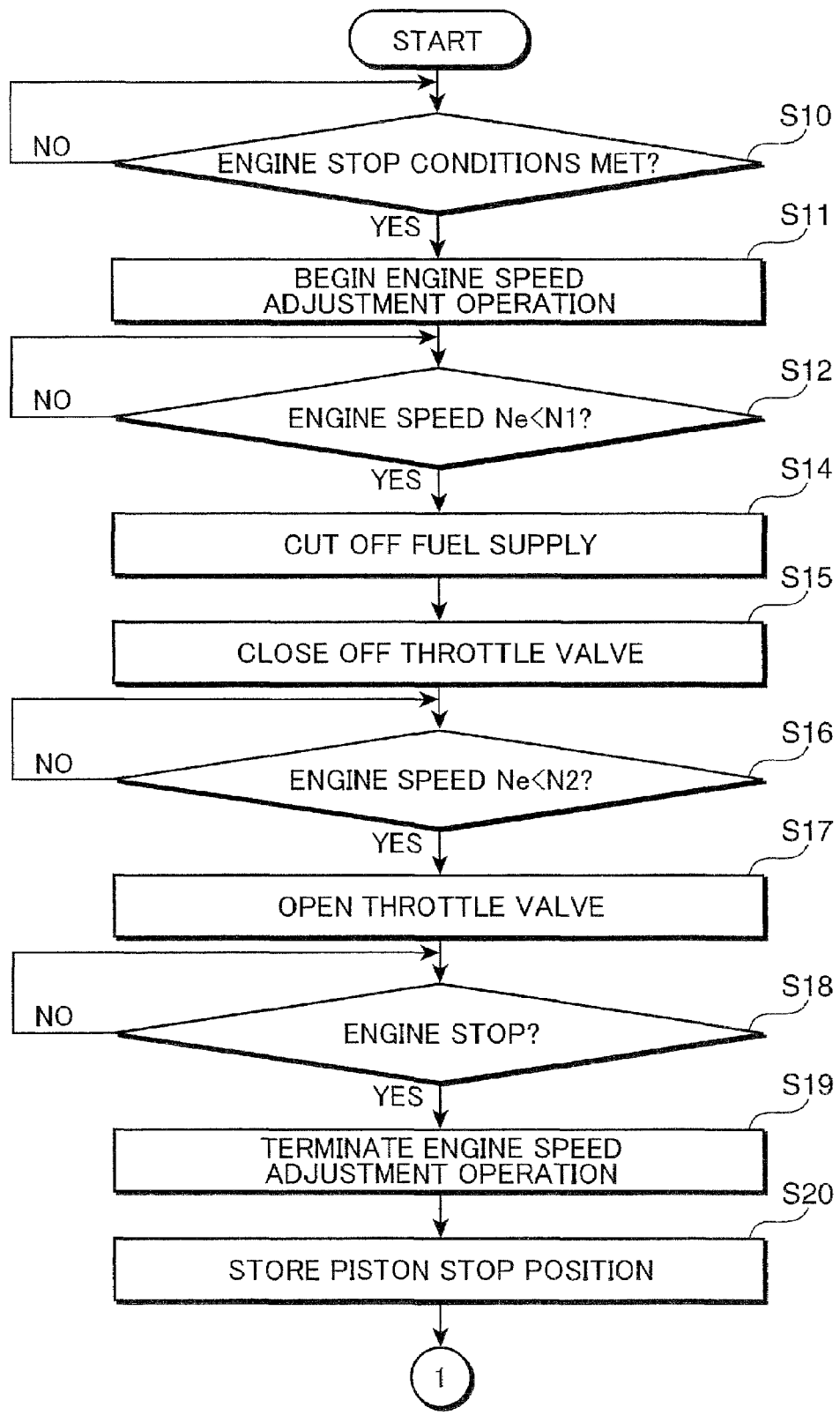
FIG. 2 is a flowchart mainly showing a sequence of automatic engine stop control operation according to the embodiment.
Figure 3:
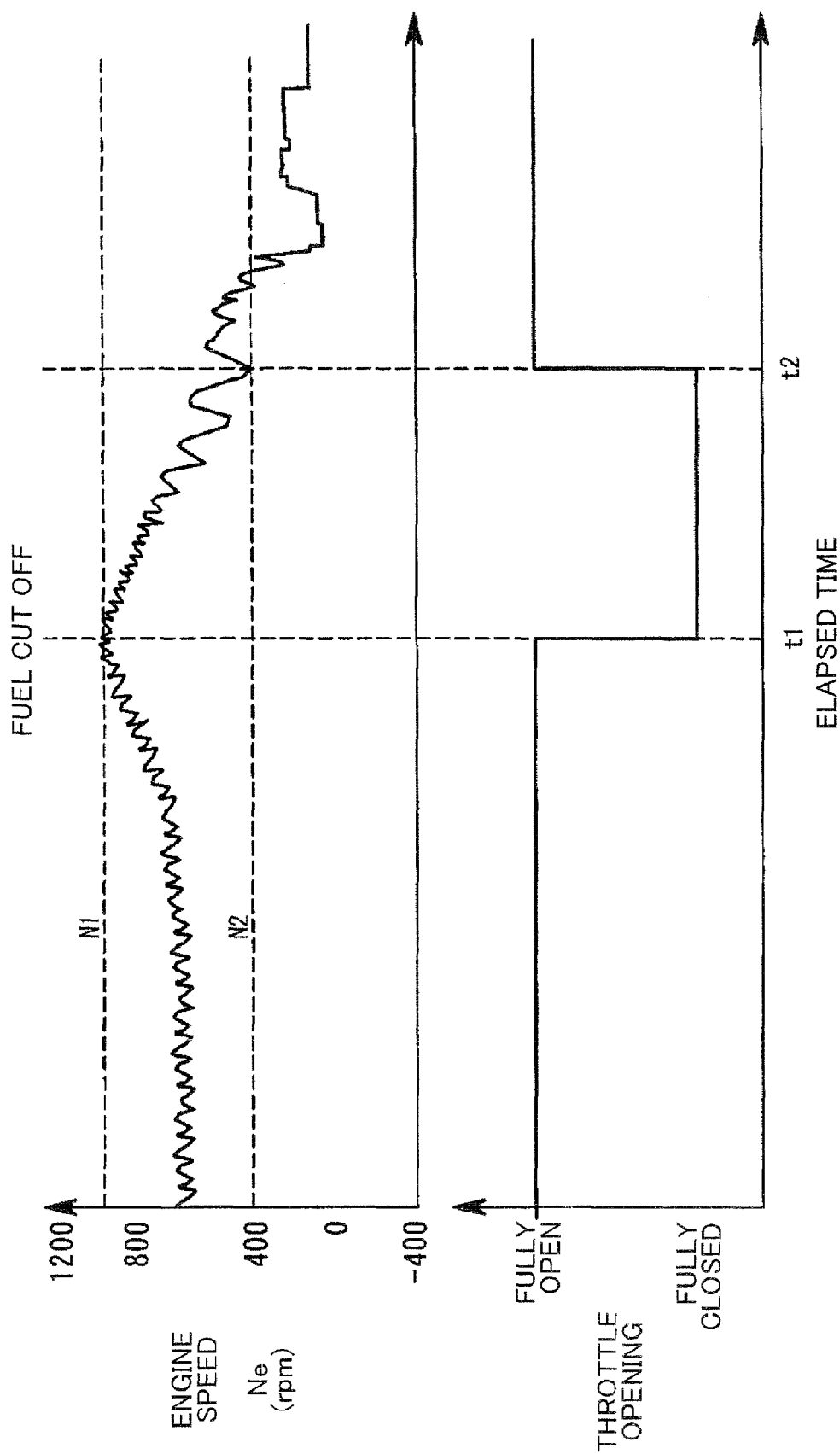
FIG. 3 is a time chart showing how engine speed varies during the automatic engine stop sequence of FIG. 2.

Now, automatic stop/restart control operations performed by the diesel engine 10 of the present embodiment are described with reference to an example shown in FIGS. 2-4. FIG. 2 is a flowchart mainly showing a sequence of the automatic engine stop control operation according to the present embodiment, and FIG. 3 is a time chart showing how the engine speed Ne varies during the automatic engine stop sequence of FIG. 2.

Referring to FIG. 2, the ECU 100 stays at standby (step S10) until predefined automatic engine stop conditions are satisfied. Specifically, the ECU 100 judges that when brakes are kept in an actuated state for a specific period of time and the vehicle speed is equal to or lower than a specified value.

If the automatic engine stop conditions are judged to have been satisfied in step S10, the ECU 100 begins to perform an engine speed adjustment operation including an alternator control process (step S11). Specifically, the ECU 100 waits until the engine speed Ne is adjusted to a preset first engine speed N1 (e.g., 850 rpm) (step S12). The ECU 100 cuts off fuel supply from the fuel injectors 19 at a point in time t1 when the engine speed Ne equals to the first engine speed N1 (step S14). The ECU 100 fully closes the intake air shutter valve 30 at this point in time t1 (step S15). This control operation makes it possible to increase a probability that the piston 16 in the compression stroke cylinder 14 stops at the aforementioned appropriate stop position A at automatic engine stop.

To be more specific, the stop position of each piston 16 is generally determined by a balance between the amount of air in the cylinder 14 which is on the expansion stroke immediately before the engine 10 comes to a complete stop and the amount of air in the cylinder 14 which is on the compression stroke at the same timing. Therefore, in order to cause the piston 16 in the compression stroke cylinder 14 to stop within a specified range of the appropriate stop position A in the diesel engine 10 of the embodiment, to the system once decreases the amounts of air introduced into the aforementioned cylinders 14 in the beginning and then supplies a sufficient amount of air into the compression stroke cylinder 14 to adjust the amounts of intake air charged in the two cylinders 14 so that the amount of air in the cylinder 14 which is on the expansion stroke (hereinafter referred to as the expansion stroke cylinder 14) becomes greater than the amount of air in the expansion stroke cylinder 14 at automatic engine stop. To achieve this requirement, the ECU 100 fully closes the intake air shutter valve 30 at the point in time t1 to decrease the intake air pressure and thus reduce the amounts of air introduced into the expansion stroke cylinder 14 and the compression stroke cylinder 14 at automatic engine stop.

After the ECU 100 cuts off fuel injection at the point in time t1, the individual cylinders 14A-14D go through the repetitive cycles of the intake, compression, expansion and exhaust strokes with extremely small amounts of intake air. As kinetic energy of the crankshaft 15 and associated elements is consumed by mechanical losses due to frictional resistance and pumping work of the cylinders 14A-14D, the engine 10 slows down in gradually weakening oscillatory motion and completely stops after one of the cylinders 14A-14D has gone through the compression stroke TDC 10 times or so in the four-cylinder, four-stroke engine 10 of the present embodiment. In this automatic engine stop process, successive valleys in a waveform of the engine speed Ne (refer to FIG. 3) correspond to points in time when the pistons 16 in the individual cylinders 14A-14D are successively at the compression stroke TDCs.

After fully closing the intake air shutter valve 30 at the point in time t1 in step S15, the ECU 100 of the embodiment waits until the engine speed Ne becomes lower than a preset second engine speed N2 (e.g., approximately 400 rpm) (step S16). A point in time t2 when the engine speed Ne equals the second engine speed N2 coincides with a timing at which the piston 16 in the compression stroke cylinder 14 at automatic engine stop reaches the TDC on the intake stroke after the compression stroke.

If the judgment result in step S16 is in the affirmative, the ECU 100 opens the intake air shutter valve 30 (step S17). As the intake air shutter valve 30 is so opened, a greater amount of fresh air is introduced into the compression stroke cylinder 14 than into the expansion stroke cylinder 14 at automatic engine stop, whereas the expansion stroke cylinder 14 at automatic engine stop containing a less amount of air has now gone through the compression stroke with the intake valve 26 and the exhaust valve 27 of the cylinder 14 closed and reached the expansion stroke. As a result, the amount of air in the compression stroke cylinder 14 at automatic engine stop becomes greater than the amount of air in the expansion stroke cylinder 14 at automatic engine stop.

Subsequently, the ECU 100 continues to adjust the stop positions of the pistons 16 through continued execution of the alternator control process and waits until the engine 10 completely stops while monitoring the values of the sensing signals fed from the two crank angle sensors SW5, SW6 (step S18). When the engine 10 completely stops, the ECU 100 ceases performing the engine speed adjustment operation (step S19).

It is not later than a timing when the engine 10 completely stops that the piston 16 in the compression stroke cylinder 14 at engine stop passes beyond the BDC on the intake stroke and transfers to the compression stroke. Since the intake valve 26 and the exhaust valve 27 of the compression stroke cylinder 14 at engine stop are generally closed at this timing, a greater amount of air introduced into the compression stroke cylinder 14 is compressed by the piston 16 which has passed beyond the BDC. On the other hand, the piston 16 in the expansion stroke cylinder 14 at engine stop, which has compressed a less amount of air in the cylinder 14, passes beyond the TDC on the compression stroke and transfers to the expansion stroke.

Accordingly, the piston 16 in the compression stroke cylinder 14 at engine stop stops at a point closer to the BDC than to the TDC because a reaction force produced in the compression stroke cylinder 14 is greater than that in the expansion stroke cylinder 14. Appropriate parameters, such as the second engine speed N2 and the point in time t2 when the second engine speed N2 is detected, are experimentally determined and set in the ECU 100 in advance, and this makes it possible to stop the piston 16 in the compression stroke cylinder 14 at a point closer to the BDC than to the TDC within the specified range (120° CA to 100° CA before the TDC on the compression stroke in this embodiment).

When the engine 10 has completely stopped, the ECU 100 stores the stop position of the piston 16 in the compression stroke cylinder 14 at engine stop determined by the operating condition checking block 101 based on the sensing signals fed from the crank angle sensors SW5, SW6 (step S20).

The automatic engine restart control operation of the invention is now described with reference to FIG. 4 which is a flowchart mainly showing a sequence of the automatic engine restart control operation according to the present embodiment.

After the engine 10 has stopped, the ECU 100 counts up a period of time elapsed from the point of engine stop (step S21). The in-cylinder temperature depends on duration of engine stop. In this embodiment, the ECU 100 stores a map containing data on a relationship between the duration of engine stop and the in-cylinder temperature and estimates the in-cylinder temperature from the accumulated period of engine stop based on this map.

More particularly, the operating condition checking block 101 of the ECU 100 calculates the in-cylinder temperature based on the intake air temperature detected by the intake air temperature sensor SW4, the temperature of the engine cooling water detected by the water temperature sensor SW7, the period of engine stop and a period of energization of the glow plugs 18 (step S22).

The ECU 100 sets a target fuel pressure from the calculated in-cylinder temperature and then the appropriate stop position A from the target fuel pressure (step S23). Subsequently, the ECU 100 examines whether the piston 16 in the compression stroke cylinder 14 at engine stop is closer to the TDC on the compression stroke than the appropriate stop position A (step S24). If the piston 16 in the compression stroke cylinder 14 at engine stop is closer to the TDC beyond the specified range of the appropriate stop position A, the plug heating control block 105 energizes the glow plug 18 of the compression stroke cylinder to increase the in-cylinder temperature (step S25). If the piston 16 in the compression stroke cylinder 14 at engine stop is within the specified range of the appropriate stop position A, on the contrary, the plug heating control block 105 does not energize the glow plug 18 (step S26).

At this point, the ECU 100 judges whether the engine restart conditions have been satisfied (step S27). The engine restart conditions are satisfied when the accelerator pedal 36 is depressed or when the automatic engine stop conditions are not satisfied, for example. If the engine restart conditions are not judged to be satisfied in step S27, the ECU 100 returns to step S21 and repeats the foregoing steps S21 through S27. The appropriate stop position A set in step S23 is corrected (shifted) with measurement time and changes in the in-cylinder cylinder temperature. If the engine restart conditions are judged to be satisfied in step S27, on the other hand, the starter control block 104 of the ECU 100 turns on the starter motor 34 (step S28), so that the piston 16 in the compression stroke cylinder 14 at engine stop moves toward the compression stroke TDC while compressing the air in the cylinder 14.

Subsequently, the fuel injection control block 102 of the ECU 100 examines whether the piston 16 in the compression stroke cylinder 14 at engine stop is closer to the compression stroke TDC than the appropriate stop position A (step S29). If the piston 16 in the compression stroke cylinder 14 at engine stop is closer to the TDC, the ECU 100 waits until the cylinder 14 on the intake stroke at engine stop (hereinafter referred to as the intake stroke cylinder 14) goes into the compression stroke. After the intake stroke cylinder 14 at engine stop has gone into the compression stroke, the fuel injection control block 102 causes the relevant fuel injector 19 to inject the fuel into the cylinder 14 with specific timing (step S30). This means that if the piston 16 in the compression stroke cylinder 14 at engine stop is out of the specified range of the appropriate stop position A, the ECU 100 does not produce combustion in the compression stroke cylinder 14 at engine stop. If the piston 16 in the compression stroke cylinder 14 at engine stop falls within the specified range of the appropriate stop position A, on the contrary, the fuel injection control block 102 causes the relevant fuel injector 19 to inject the fuel into the compression stroke cylinder 14, whereby ECU 100 attempts to restart the engine 10 by producing combustion in this cylinder 14 (step S31).

After executing step S30 or S31, whichever applicable, the ECU 100 terminates the automatic engine restart control operation and returns to normal engine operation (step S32).

As thus far described, the diesel engine 10 of the present embodiment is configured such that the pistons 16 are stopped at positions appropriate for subsequent engine restart upon fulfillment of the automatic engine stop conditions to provide enhanced restartability. Generally, it is necessary in the diesel engine 10 to inject the fuel into the compression stroke cylinder 14 at engine stop and induce self-ignition of an air-fuel mixture formed in that cylinder 14. It is therefore preferable that the piston 16 in the compression stroke cylinder 14 at engine stop would stop at a point as close as possible to the compression stroke BDC.

To meet this requirement, the diesel engine 10 of the embodiment is so configured as to limit the amount of intake air upon interruption of fuel injection and increase the amount of intake air at the point in time t2 when the second engine speed N2 is detected, at which point the piston 16 in the compression stroke cylinder 14 at engine stop is expected to transfer to a last intake stroke. Therefore, the amount of air in the compression stroke cylinder 14 at engine stop becomes greater than the amount of air in the expansion stroke cylinder 14 at engine stop in this case. As a consequence, the piston 16 in the compression stroke cylinder 14 at engine stop stops at a point closer to the compression stroke BDC than the TDC within the specified range (120° CA to 100° CA before the TDC) due to the compressive reaction force produced in the compression stroke cylinder 14 by a greater amount of air introduced thereinto than into the expansion stroke cylinder, making it possible to produce an effective compression ratio sufficiently high for self-ignition in the cylinder 14 at the time of engine restart.

In this embodiment, the piston 16 in the compression stroke cylinder 14 at engine stop may be controlled to stop within the range of 120° CA to 100° CA before the compression stroke TDC as discussed above. This makes it possible to restart the engine 10 upon optimizing the operating time of the starter motor 34 and the effective compression ratio in the compression stroke cylinder 14 at engine stop for inducing self-ignition therein. Specifically, although it is generally preferable in the diesel engine 10 that the piston 16 in the compression stroke cylinder 14 be located at a point as close as possible to the BDC at automatic engine stop, it is not desirable that the piston 16 in the compression stroke cylinder 14 be stopped too close to the BDC because the starter motor 34 must be operated for an extended period of time in this case. Taking this into consideration, the piston 16 in the compression stroke cylinder 14 at engine stop is controlled to stop at a point close to the BDC, or at the appropriate stop position A, which is set within the range of 120° CA to 100° CA before the TDC to achieve both a reduction in operating time of the starter motor 34 and secure self-ignition in the compression stroke cylinder 14, thereby providing enhanced engine restartability.

The ECU 100 of the present embodiment is adapted to examine whether the piston 16 in the compression stroke cylinder 14 is located within the specified range of the appropriate stop position A at engine stop, and first inject the fuel into the compression stroke cylinder 14 at engine stop if the piston 16 in the compression stroke cylinder 14 at engine stop is located within the specified range of the appropriate stop position A upon fulfillment of the engine restart conditions, into the intake stroke cylinder 14 at engine stop if the piston 16 in the compression stroke cylinder 14 at engine stop is located at a point offset from the specified range of the appropriate stop position A toward the compression stroke TDC upon fulfillment of the engine restart conditions.

Thus, according to the foregoing embodiment, if the piston 16 in the compression stroke cylinder 14 at engine stop is located generally at the appropriate stop position A, the fuel is injected into the compression stroke cylinder 14 at engine stop and the starter motor 34 is run to compress an air-fuel mixture formed in the compression stroke cylinder 14, thereby inducing self-ignition therein and restarting the engine 10. If the piston 16 in the compression stroke cylinder 14 at engine stop is much displaced from the appropriate stop position A toward the compression stroke TDC, on the other hand, the fuel is injected into the intake stroke cylinder 14, and not the compression stroke cylinder 14, at engine stop. Although the operating time of the starter motor 34 slightly increases in this case, it is possible to securely induce self-ignition of an air-fuel mixture at a sufficiently high effective compression ratio, thereby providing enhanced engine restartability.

As mentioned in the foregoing discussion of preferred embodiment, the plug heating control block 105 of the ECU 100 for controlling the glow plugs 18 is adapted to energize the glow plug 18 of the compression stroke cylinder to increase the in-cylinder temperature if the piston 16 in the compression stroke cylinder 14 at engine stop is offset from the appropriate stop position A toward the compression stroke TDC, and the ECU 100 is adapted to correct the appropriate stop position A to a point closer to the TDC according to the temperature in the compression stroke cylinder 14 at engine stop.

Thus, according to the foregoing embodiment, it is possible to provide as much enhanced engine restartability as possible even when the piston 16 in the compression stroke cylinder 14 at engine stop is offset from the appropriate stop position A toward the compression stroke TDC. Specifically, since a delay in self-ignition, if any, is dependent on the in-cylinder temperature, it is possible to make up for a lack of the effective compression ratio and thereby enhance the engine restartability by increasing the in-cylinder temperature. Moreover, since the appropriate stop position A can be corrected (shifted) to a point closer to the TDC, it is possible to successfully restart the engine 10 by inducing self-ignition in the compression stroke cylinder 14 at engine stop while reducing the operating time of the starter motor 34 as much as possible.

In summary, according to a first aspect of the present invention, a method of controlling a diesel engine comprises the steps of: (a) stopping fueling the engine upon fulfillment of an engine stop condition while the engine is running; (b) positioning a piston of a first cylinder, which is in a compression stroke of a cylinder cycle when the engine completely stops, at a first stop position that is closer to the bottom dead center than to the top dead center; and (c) cranking the engine and starting fueling the engine by first injecting fuel into the first cylinder upon fulfillment of an engine restart condition while the engine is at rest.

This method of controlling a diesel engine causes the piston of a particular cylinder to stop at a position appropriate for subsequent engine restart upon fulfillment of the engine stop condition, making it possible to provide enhanced engine restartability. Generally, it is necessary in the diesel engine to inject the fuel into a compression stroke cylinder at engine stop and induce self-ignition of an air-fuel mixture formed in that cylinder. It is therefore preferable that the piston in the compression stroke cylinder at engine stop would stop at a point as close as possible to the bottom dead center because it increases the temperature in the cylinder when it reaches at the top dead center at an engine restart.

The method of the first aspect, by positioning the piston of the compression stroke cylinder at a first stop position that is closer to the bottom dead center than to the top dead center, may increase the effective compression ratio of and the temperature in the compression stroke cylinder at an engine restart. As a result, it may improve the engine restartability.

In the aforementioned first aspect of the invention, the step of positioning the piston in the first cylinder may be performed by controlling an engine running resistance while the engine is being brought to a complete stop.

In the aforementioned method, the controlling the engine running resistance may include the steps of: temporarily increasingly throttling intake airflow to the engine after the engine stop condition is met; and decreasingly throttling the intake airflow when engine speed reaches a first predetermined speed after increasingly throttling the intake airflow.

In the aforementioned method, the step of increasingly throttling intake airflow to the engine temporarily is preferably performed when the engine speed reaches a second predetermined speed (corresponding to "N1" in S12: FIGS. 2 & 3) that is greater than the first predetermined speed (corresponding to "N2" in S16: FIGS. 2 & 3).

In this method of controlling the diesel engine, the amount of intake air is limited upon interruption of fuel injection and increased at a point in time when the engine speed reaches the second predetermined speed at which the piston in the compression stroke cylinder at engine stop is expected to transfer to a last intake stroke. Therefore, the amount of air in the compression stroke cylinder at engine stop becomes greater than the amount of air in an expansion stroke cylinder at engine stop in this case. As a consequence, the piston in the compression stroke cylinder at engine stop stops at a point closer to the compression stroke BDC than to the TDC due to a reaction force produced in the compression stroke cylinder by a greater amount of air introduced thereinto than into the expansion stroke cylinder, making it possible to produce an effective compression ratio sufficiently high for self-ignition in the cylinder at a point of engine restart.

In the aforementioned method, the first stop position is preferably 100 degrees or more away from the top dead center.

This method makes it possible to restart the engine by properly adjusting operating time of a starter motor and the effective compression ratio for inducing self-ignition.

More preferably, the first stop position is between 100 and 120 degrees before the top dead center.

This method of controlling the diesel engine makes it possible to restart the engine upon optimizing the operating time of the starter motor and the effective compression ratio in the compression stroke cylinder at engine stop for inducing self-ignition therein. Specifically, although it is generally preferable in the diesel engine that the piston in the compression stroke cylinder be located at a point as close as possible to the BDC at automatic engine stop, it is not desirable that the piston in the compression stroke cylinder be stopped too close to the BDC because the starter motor must be operated for an extended period of time in this case. Taking this into consideration, the piston in the compression stroke cylinder at engine stop is controlled to stop at a point close to the BDC set within a range of 120° CA to 100° CA before the TDC to achieve both a reduction in operating time of the starter motor and secure self-ignition in the compression stroke cylinder, thereby providing enhanced engine restartability.

In the aforementioned method, the step of positioning the piston of the first cylinder may be performed by heating air in the first cylinder. The aforementioned method may further comprise the step of stopping heating the air in the first cylinder when the piston of the first cylinder reaches the first stop position. In the aforementioned method, the air in the first cylinder may be heated by electrical heating.

According to this method of controlling the diesel engine, it is possible to provide as much enhanced engine restartability as possible even when the piston in the compression stroke cylinder at engine stop is offset from the appropriate stop position toward the compression stroke TDC. Specifically, since a delay in self-ignition, if any, is dependent on in-cylinder temperature, it is possible to make up for a lack of the effective compression ratio and thereby enhance the engine restartability by increasing the in-cylinder temperature. Moreover, since the appropriate stop position can be corrected (shifted) to a point closer to the TDC, it is possible to successfully restart the diesel engine by inducing self-ignition in the compression stroke cylinder at engine stop while reducing the operating time of the starter motor as much as possible.

In a second aspect of the present invention, a method of controlling a diesel engine comprises the steps of: (a) stopping fueling the engine upon fulfillment of an engine stop condition while the engine is running; (b) cranking the engine and starting fueling the engine by first injecting fuel into a first cylinder which is in a compression stroke of a cylinder cycle when the engine completely stops if a piston of the first cylinder is positioned at a first position closer to the bottom dead center than to the top dead center; and (c) cranking the engine and starting fueling the engine by first injecting the fuel into a second cylinder which is in an intake stroke of a cylinder cycle when the engine completely stops if the piston of the first cylinder is positioned between the top dead center and the first stop position.

In this method of controlling a diesel engine, if the piston in the compression stroke cylinder at engine stop is located generally at an appropriate stop position, the fuel is injected into the compression stroke cylinder at engine stop and a starter motor is run to compress an air-fuel mixture formed in the compression stroke cylinder, thereby inducing self-ignition therein and restarting the diesel engine. If the piston in the compression stroke cylinder at engine stop is displaced from the appropriate stop position toward the top dead center, the fuel is injected into the intake stroke cylinder, and not the compression stroke cylinder, at engine stop. Although operating time of the starter motor slightly increases in this case, it is possible to securely induce self-ignition of an air-fuel mixture at a sufficiently high effective compression ratio, thereby providing enhanced engine restartability.

The method according to the second aspect of the invention may further comprise the step of temporarily increasingly throttling intake airflow to the engine upon fulfillment of the engine stop condition and decreasingly throttling the intake airflow when the engine speed reaches a first predetermined speed after increasingly throttling the intake airflow.

In the aforementioned method, the first stop position is preferably 100 degrees or more away from the top dead center.

The method according to the second aspect of the invention may further comprise the step of heating air in the first cylinder before the engine restart condition is met if the piston of the first cylinder is positioned between the top dead center and the first stop position.

The method according to the second aspect of the invention may further comprise the step of stopping heating the air in the first cylinder when the piston of the first cylinder reaches the first stop position.

In the aforementioned method, the air in the first cylinder may be heated by electrical heating.

According to this method of controlling the diesel engine, it is possible to provide as much enhanced engine restartability as possible even when the piston in the compression stroke cylinder at engine stop is offset from the appropriate stop position toward the compression stroke TDC. Specifically, since a delay in self-ignition, if any, is dependent on in-cylinder temperature, it is possible to make up for a lack of the effective compression ratio and thereby enhance the engine restartability by increasing the in-cylinder temperature. Moreover, since the appropriate stop position can be corrected (shifted) to a point closer to the TDC, it is possible to successfully restart the diesel engine by inducing self-ignition in the compression stroke cylinder at engine stop while reducing the operating time of the starter motor as much as possible.

According to a third aspect of the present invention, a diesel engine system comprises: (a) a diesel engine having cylinders including a first cylinder, pistons, a crankshaft linked to the pistons for reciprocally moving the pistons in the cylinders, and fuel injectors capable of directly injecting fuel into the respective cylinders; (b) a throttle valve arranged in an intake air passage of the diesel engine for throttling intake air into the cylinders; (c) a starter motor capable of rotating the crankshaft; and (d) a controller which controls (i) the fuel injectors to stop fueling the cylinders upon fulfillment of an engine stop condition; (ii) the throttle valve to close upon fulfillment of the engine stop condition and open when the engine speed reaches a predetermined speed so that the piston of the first cylinder, which is in a compression stroke of a cylinder cycle when the engine completely stops, stops at a first stop position that is closer to the bottom dead center than to the top dead center; and (iii) the starter motor to crank the engine and the fuel injectors to start fueling the engine by first injecting the fuel into the first cylinder upon fulfillment of an engine restart condition.

This diesel engine system is configured such that the pistons are stopped at positions appropriate for subsequent engine restart upon fulfillment of the engine stop condition, thereby providing enhanced engine restartability.

The aforementioned diesel engine system may further comprise electric heaters arranged in the cylinders, wherein the controller activates the heater of the first cylinder when the piston of the first cylinder is positioned between the top dead center and the first stop position.

The diesel engine system of the invention thus configured can provide as much enhanced engine restartability as possible even when the piston in the compression stroke cylinder at engine stop is offset from an appropriate stop position toward the compression stroke TDC. Specifically, since a delay in self-ignition, if any, is dependent on in-cylinder temperature, it is possible to make up for a lack of the effective compression ratio and thereby enhance the engine restartability by increasing the in-cylinder temperature. Moreover, since the appropriate stop position can be corrected (shifted) to a point closer to the TDC, it is possible to successfully restart the diesel engine by inducing self-ignition in the compression stroke cylinder at engine stop while reducing the operating time of the starter motor as much as possible.

In the aforementioned diesel engine system, the first stop position is preferably between 100 and 120 degrees before the top dead center.

The diesel engine system of the invention makes it possible to restart the engine upon optimizing the operating time of the starter motor and the effective compression ratio in the compression stroke cylinder at engine stop for inducing self-ignition therein. Specifically, although it is generally preferable in the diesel engine that the piston in the compression stroke cylinder be located at a point as close as possible to the BDC at automatic engine stop, it is not desirable that the piston in the compression stroke cylinder be stopped too close to the BDC because the starter motor must be operated for an extended period of time in this case. Taking this into consideration, the piston in the compression stroke cylinder at engine stop is controlled to stop at a point close to the BDC set within a range of 120° CA to 100° CA before the TDC to achieve both a reduction in operating time of the starter motor and secure self-ignition in the compression stroke cylinder, thereby providing enhanced engine restartability.

As thus far described, the method of controlling the diesel engine and the diesel engine system of the invention are adapted to limit the amount of intake air upon interruption of fuel injection and increase the amount of intake air at a point in time when the engine speed reaches the second predetermined speed at which the piston in the compression stroke cylinder at engine stop is expected to transfer to a last intake stroke. Therefore, the amount of air in the compression stroke cylinder at engine stop becomes greater than the amount of air in an expansion stroke cylinder at engine stop. As a consequence, the piston in the compression stroke cylinder at engine stop stops at a point close to the compression stroke BDC due to the compressive reaction force produced in the compression stroke cylinder by a relatively large amount of air introduced thereinto, making it possible to produce an effective compression ratio sufficiently high for self-ignition in the cylinder at a point of engine restart. It is appreciated from the foregoing that the control method and the diesel engine system of the invention exhibit significant effects in achieving enhanced restartability of the diesel engine after an automatic engine stop while providing as high fuel economy as possible.

It is to be understood that the above-described arrangements of the embodiment are simply illustrative of the invention and that the invention is not limited to the foregoing embodiment.

Figure 4:
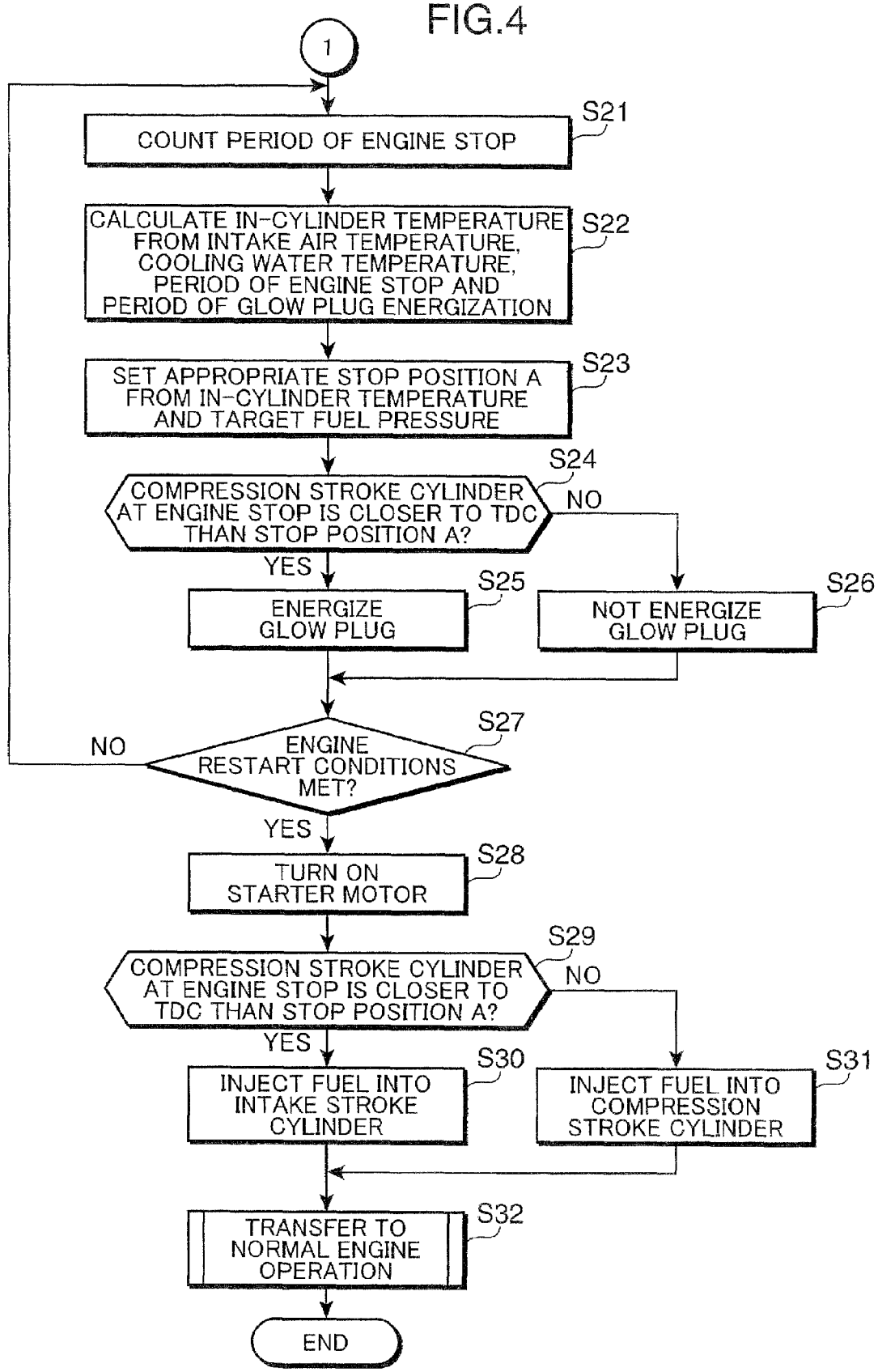
FIG. 4 is a flowchart mainly showing a sequence of automatic engine restart control operation according to the embodiment.

For example, the sequence shown in the flowchart of FIG. 4 may be so modified as not to include in-cylinder temperature control operation of steps S24 to S26 performed by using the glow plugs 18. If the sequence is so modified, it becomes unnecessary to take into consideration the period of energization of the glow plug 18 of the compression stroke cylinder when calculating the in-cylinder temperature in step S22.

This application is based on Japanese Patent Application Serial No. 2007-233842 filed on Sep. 10, 2007 with the Japan Patent Office, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method of controlling a diesel engine, comprising:
stopping fueling said engine upon fulfillment of an engine stop condition while said engine is running;
positioning a piston of a first cylinder, which is in a compression stroke of a cylinder cycle when the engine completely stops, at a first stop position that is closer to the bottom dead center than to the top dead center; and
cranking said engine and starting fueling said engine by first injecting fuel into said first cylinder upon fulfillment of an engine restart condition while said engine is at rest.

2. The method according to claim 1, wherein said positioning the piston in said first cylinder is performed by controlling an engine running resistance while said engine is being brought to a complete stop.

3. The method according to claim 2, wherein said controlling the engine running resistance includes:
temporarily increasingly throttling intake airflow to said engine after the engine stop condition is met; and
decreasingly throttling the intake airflow when engine speed reaches a first predetermined speed after increasingly throttling the intake airflow.

4. The method according to claim 3, wherein said temporarily increasingly throttling intake airflow to said engine is performed when the engine speed reaches a second predetermined speed that is grater than said first predetermined speed.

5. The method according to claim 2, wherein said first stop position is 100 degrees or more away from the top dead center.

6. The method according to claim 3, wherein said first stop position is 100 degrees or more away from the top dead center.

7. The method according to claim 1, wherein said first stop position is between 100 and 120 degrees before the top dead center.

8. The method according to claim 1, wherein said positioning the piston of said first cylinder is performed by heating air in said first cylinder.

9. The method according to claim 8, further comprising stopping heating the air in said first cylinder when said piston of said first cylinder reaches said first stop position.

10. The method according to claim 8, wherein the air in said first cylinder is heated by electrical heating.

11. A method of controlling a diesel engine, comprising:
stopping fueling said engine upon fulfillment of an engine stop condition while said engine is running;
cranking said engine and starting fueling said engine by first injecting fuel into a first cylinder which is in a compression stroke of a cylinder cycle when said engine completely stops if a piston of the first cylinder is positioned at a first position closer to the bottom dead center than to the top dead center; and
cranking said engine and starting fueling said engine by first injecting the fuel into a second cylinder which is in an intake stroke of a cylinder cycle when the engine completely stops if the piston of said first cylinder is positioned between the top dead center and the first stop position.

12. The method according to claim 11, further comprising temporarily increasingly throttling intake airflow to said engine upon fulfillment of the engine stop condition and decreasingly throttling the intake airflow when the engine speed reaches a first predetermined speed after increasingly throttling the intake airflow.

13. The method according to claim 11, wherein said first stop position is 100 degrees or more away from the top dead center.

14. The method according to claim 12, wherein said first stop position is 100 degrees or more away from the top dead center.

15. The method according to claim 11, further comprising heating air in said first cylinder before said engine restart condition is met if the piston of said first cylinder is positioned between the top dead center and said first stop position.

16. The method according to claim 11, further comprising stopping heating the air in said first cylinder when the piston of said first cylinder reaches said first stop position.

17. The method according to claim 11, wherein the air in said first cylinder is heated by electrical heating.

18. A diesel engine system comprising:
a diesel engine having cylinders including a first cylinder, pistons, a crankshaft linked to said pistons for reciprocally moving said pistons in said cylinders, and fuel injectors capable of directly injecting fuel into said respective cylinders;
a throttle valve arranged in an intake air passage of said diesel engine for throttling intake air into said cylinders;
a starter motor capable of rotating said crankshaft; and
a controller which controls;
said fuel injectors to stop fueling said cylinders upon fulfillment of an engine stop condition;
said throttle valve to close upon fulfillment of the engine stop condition and open when the engine speed reaches a predetermined speed so that the piston of said first cylinder, which is in a compression stroke of a cylinder cycle when the engine completely stops, stops at a first stop position that is closer to the bottom dead center than to the top dead center; and
said starter motor to crank said engine and said fuel injectors to start fueling said engine by first injecting the fuel into said first cylinder upon fulfillment of an engine restart condition.

19. The diesel engine system according to claim 18, further comprising an electric heater arranged in said cylinders, wherein said controller activates the heater of said first cylinder when the piston of said first cylinder is positioned between the top dead center and said first stop position.

20. The diesel engine system according to claim 18, wherein said first stop position is between 100 and 120 degrees before the top dead center.

* * * * *